Sept. 3, 1935.   J. BIBBY   2,012,939
POWER TRANSMISSION THROUGH ROTARY SHAFTS
Filed Aug. 21, 1934
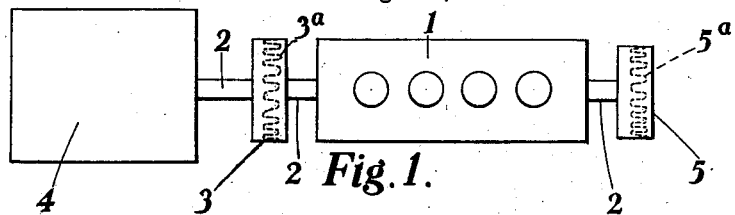
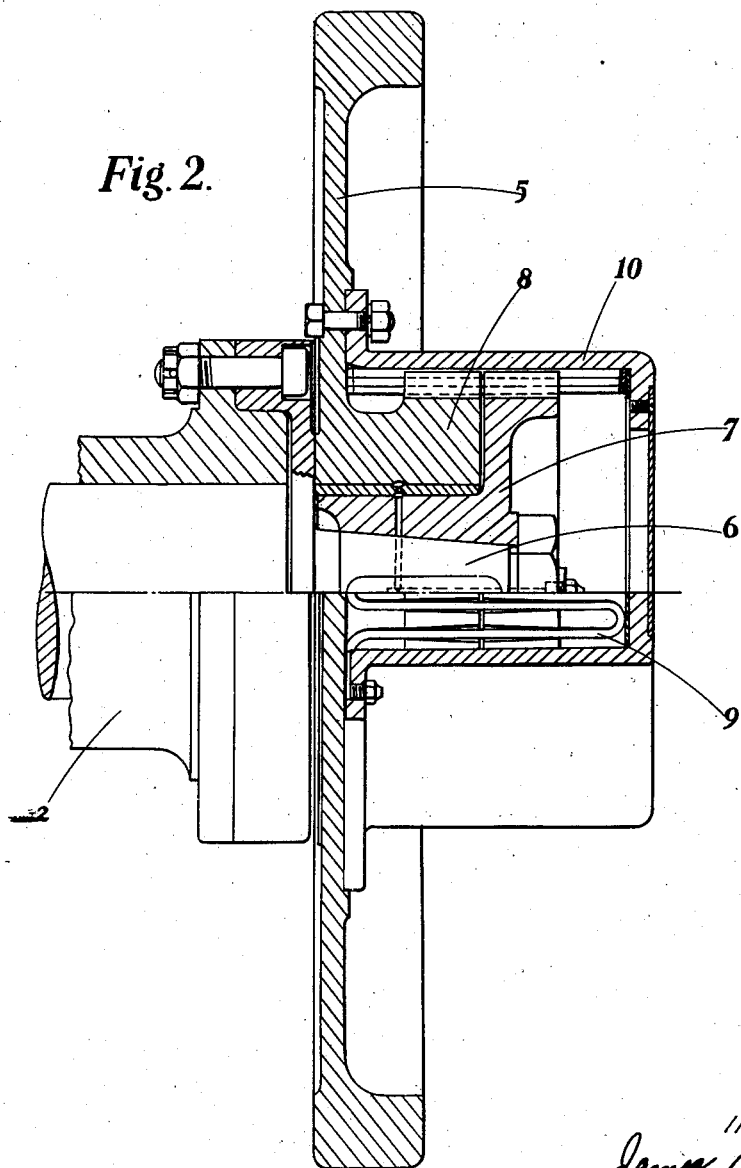
INVENTOR
James Bibby
BY
E. F. Wenderoth
ATTORNEY Patented Sept. 3, 1935

2,012,939

UNITED STATES PATENT OFFICE 2,012,939

POWER TRANSMISSION THROUGH ROTARY SHAFTS

James Bibby, London, England, assignor to The Falk Corporation, Milwaukee, Wis.

Application August 21, 1934, Serial No. 740,808 In Great Britain August 18, 1933

4 Claims. (Cl. 74—574)

This invention relates to power transmission through rotary shafts and has for its object to avoid or reduce the dangers due to vibration particularly at critical speeds.

On many drives it is desirable and is now customary to supplement the usual flywheel with an auxiliary flywheel for the purpose of modifying the vibratory conditions.

On internal combustion engines for example it is often necessary to fit an auxiliary flywheel on the tail or non-driving end of the crank shaft.

The effect of any such auxiliary flywheel of given inertia is a function of the torsional stiffness of the shaft elements between this flywheel and the other rotating masses.

In auxiliary flywheels a friction damper is often incorporated and depends for its efficiency on the resistance to relative motion of rotating parts. One part is constrained to vibrate with the shaft whilst the other part, which is frictionally connected to it, tends to maintain uniform motion through its inertia.

According to the present invention I connect the auxiliary flywheel or the main flywheel or both flywheels to the shaft through a spring coupling so as greatly to reduce the torsional stiffness between said flywheel or flywheels and the other rotating parts. Further I make the spring coupling in such a way that it automatically stiffens with increase in torque so that the frequency of the system automatically increases when (graphically speaking) the torque range increases at a normal resonant position on the speed line. When a normal critical speed is entered, the coupling moves the frequency of the system away from this speed.

Further if, as may be desirable in some cases, a frictional or other damper is used its effect is greatly increased because the reduction of stiffness due to the spring coupling increases the amplitude of the vibratory motion upon which the damping depends.

In the preferred construction the spring coupling is actually incorporated or embodied in the auxiliary flywheel or in the main flywheel so that the endwise dimensions of the power transmission system are not increased by such incorporation.

In the accompanying drawing Figure 1 is a plan view showing conventionally a four-cylinder engine with main and auxiliary flywheels in either or both of which may be embodied the resilient coupling according to the present invention.

Figure 2 is a sectional elevation of the end of the crank shaft carrying the auxiliary flywheel and the resilient coupling embodied therein.

Referring first to Figure 1 the reference numeral 1 indicates a four-cylinder engine acting as a source of rotary power. The rotary shaft 2 is provided with a main flywheel 3 located between the source of power 1 and the power consumer or plant 4. 5 is an auxiliary flywheel mounted on the engine shaft at its opposite end.

The torsionally resilient coupling is employed according to the present invention between the engine shaft and the main flywheel 3 or between the engine shaft and the auxiliary flywheel 5, and is either interposed in a gap in the shafting or is embodied inside the flywheel or flywheels, the latter being preferable as shown at 3a and 5a in Figure 1, so as not to increase the overall length of the assembly.

Referring now to Figure 2, it is seen that the non-driving flanged end of the shaft 2 has secured to it a coned adapter shaft 6. The torsionally resilient coupling comprises the driving member 7, fixed to the adapter shaft 6, and the driven member 8 with which is embodied the flywheel 5. The cylindrical peripheries of the coupling members 7 and 8 are longitudinally grooved to receive the parallel limbs of a zig-zag or grid-like interconnecting spring strip element or group of elements 9.

The torsional stiffness between the shaft 2 and the flywheel 5 is determined by the shape of the interconnecting element 9 and of the grooves, in which the parallel limbs thereof lie. The arrangement is such that with increasing torque the free span of each of the spring limbs shortens and the stiffness thereby increases. As shown the spring limbs are straight and the parallel walls between them are tapered somewhat like gear-teeth to secure the above effect. At normal loads on the engine, the stiffness of the grid-like interconnecting element or elements determines the frequency of the engine system. Immediately the engine system commences to get into torsional resonance the torque increases and thereby stiffens the spring limbs so that the frequency is raised away from that particular speed at which the resonance was appearing.

The coupling is preferably enclosed in a casing 10 which also retains a lubricating medium.

In accordance with the provisions of the patent statutes I have described the principle and operation of my invention together with the apparatus which I now consider to represent the best embodiment thereof but I desire to have it understood that the construction shown is only illustrative and that the invention can be carried out by other means.

What I claim is:—

1. A vibration dampener comprising a shaft, a driving member fast to one end of said shaft, and having axially extending, inwardly flaring grooves in its periphery, a flywheel concentric with and rotatable about said shaft, a driven member fast to said flywheel and loosely mounted on said driving member so that both the flywheel and the driven member are rotatable relative to said driving member, said driving and driven members being axially aligned, and said driven member being disposed inwardly along said shaft from said driving member, said driven member having axially extending outwardly flaring grooves in its periphery, aligned with the grooves of said driving member, and grid-like spring elements in said grooves serving to couple said members together.

2. A vibration dampener comprising a shaft, a driving member fast to one end of said shaft, and having axially extending, inwardly flaring grooves in its periphery, a flywheel concentric with and rotatable about said shaft, a driven member fast to said flywheel and loosely mounted on said driving member so that both the flywheel and the driven member are rotatable relative to said driving member, said driving and driven members being axially aligned, and said driven member being disposed inwardly along said shaft from said driving member, said driven member having axially extending outwardly flaring grooves in its periphery, aligned with the grooves of said driving member, and grid-like spring elements in said grooves serving to couple said members together, and a casing fast to said flywheel and enclosing the end of said shaft, the driving and driven members, and the said elements, and being adapted to contain a lubricating medium.

3. In a power system comprising a source of power, a flywheel, a load, and shafting interconnecting the aforementioned elements; an auxiliary flywheel for modifying the natural frequency of the system, said auxiliary flywheel being rotatable relative to the shafting and independent of the transmitted torque, and means for changing the effect of the auxiliary flywheel on the system when the system approaches torsional resonance, as an incident to increase in torque, the said means comprising part of said auxiliary flywheel, and comprising separate, axially aligned driving and driven members, the driving member being fast on one end of the shafting and the driven member being fast to the inertia part of said auxiliary flywheel, the said driven member being loosely mounted on said driving member so that both it and the said auxiliary flywheel are rotatable relative to said driving member, the said driven member being disposed inwardly along said shaft from said driving member, axially extending, aligned and inwardly flaring opposed grooves in the peripheries of said driving and driven members, and grid-like spring elements lying in said grooves and interconnecting said members, increase in torque due to approaching resonance of the system resulting in shifting of the contact positions of said spring elements along said flaring grooves, and stiffening of the coupling between said members, to vary the natural frequency of the system.

4. In a power system comprising a source of power, a flywheel, a load, and shafting interconnecting the aforementioned elements; an auxiliary flywheel for modifying the natural frequency of the system, said auxiliary flywheel being rotatable relative to the shafting and independent of the transmitted torque, and means for changing the effect of the auxiliary flywheel on the system when the system approaches torsional resonance, as an incident to increase in torque, the said means comprising part of said auxiliary flywheel, and comprising separate, axially aligned driving and driven members, the driving member being fast on one end of the shafting and the driven member being fast to the inertia part of said auxiliary flywheel, the said driven member being loosely mounted on said driving member so that both it and the said auxiliary flywheel are rotatable relative to said driving member, the said driven member being disposed inwardly along said shaft from said driving member, axially extending, aligned and inwardly flaring opposed grooves in the peripheries of said driving and driven members, grid-like spring elements lying in said grooves and interconnecting said members, increase in torque due to approaching resonance of the system resulting in shifting of the contact positions of said spring elements along said flaring grooves, and stiffening of the coupling between said members, to vary the natural frequency of the system, and a casing fast to said inertia part of said auxiliary flywheel and enclosing said driving and driven members, the end of said shafting and the said spring elements, and being adapted to house a lubricant.

JAMES BIBBY.